J. STONE.
Wheel Plow.
No. 44,351.
Patented Sept. 20, 1864.
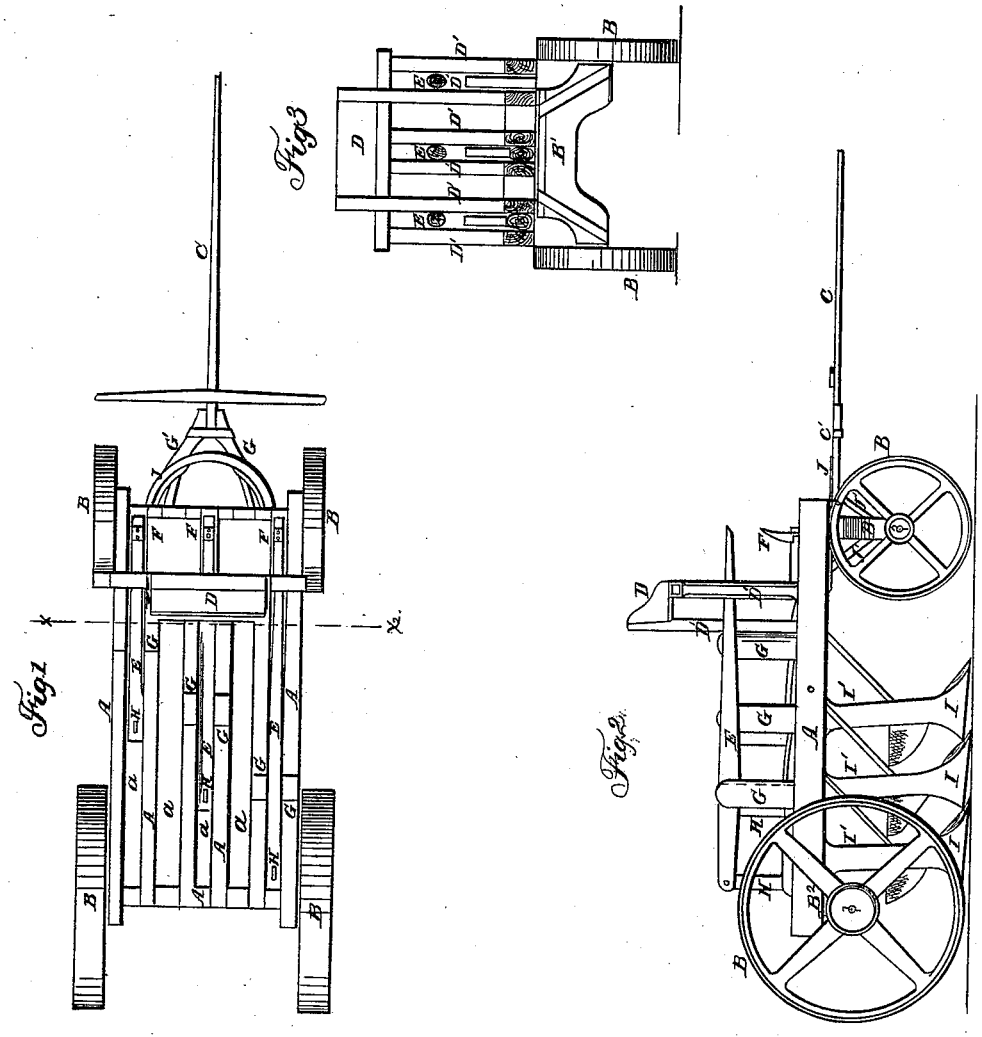
Witnesses:
C D Smith
R W Eagl
Inventor:
John Stone

UNITED STATES PATENT OFFICE.

JOHN STONE, OF PLATTSBURG, MISSOURI.

GANG-PLOW.

Specification forming part of Letters Patent No. 44,351, dated September 20, 1864.

*To all whom it may concern:*

Be it known that I, JOHN STONE, of Plattsburg, in the county of Clinton and State of Missouri, have invented a new and useful Improvement in Gang-Plows; and I do hereby declare the following to be a full and exact description of the same, reference being had to the accompanying drawings, making part of this specification, in which—

Figure 1 is a plan of a gang-plow embodying my invention. Fig. 2 is a side elevation of the same. Fig. 3 is a transverse section in the line $x$ $x$, Fig. 1.

Similar letters of reference indicate corresponding parts in the several views.

This invention relates to a gang-plow adapted to be moved from place to place on its own wheels and brought into action with convenience and dispatch, and in which are employed one, two, three, or more plows, the positions of which are controlled by a corresponding number of levers, which are operated with facility by the feet of the driver; and these levers, when depressed so as to elevate the plows out of contact with the ground, are retained in a novel manner by spring-catches, which need only to be pressed on by the feet of the driver when it is desired to release the plows and permit them to assume their working positions, all as will be hereinafter fully explained.

In order that others skilled in the art to which my invention appertains may be enabled to fully understand and use the same, I will proceed to describe its construction and operation.

In the accompanying drawings, A is the main frame of my improved plow, which is mounted upon four wheels, B, by means of axles B' B².

C is the tongue, and D the driver's seat, the latter being mounted upon a frame, D', erected at the forward end of the machine, and consisting of a series of uprights, between which are spaces, in order that the levers E may extend forward of the driver's seat to be operated by the person sitting thereon and be held down by the spring-catches F. The uprights composing the frame D' retain the levers E in proper position—that is to say, they prevent said levers from moving laterally. The levers E have their fulcra in standards G, upon or within which they are adapted to vibrate freely on a vertical plane, and said levers are jointed to links H, which in turn are pivoted to the knee-shaped standards I' of the plows I. In the frame A are spaces $a$, in which the standards I' may move with perfect freedom. The horizontal portion of each standard I' extends forward to the front of the machine and is there securely attached by pivots, which may pass through the longitudinal beams of the frame A and project above the top thereof, said catches being adapted to spring back and forth in a line parallel with the longitudinal center of the machine, the levers E occupying a corresponding position. The normal position of each catch F is such that when its corresponding lever is depressed it will engage over the end thereof and retain the same in its depressed condition.

When it is desired to raise the plows above the ground when the work of the implement is to be suspended the driver merely has to depress the ends of the levers with his feet, when they are automatically caught and retained by the catches F, and when the plows are to be lowered to their working position it is only necessary to impart a forward pressure upon the respective catches F, which done, the plows, being thereby released, fall to the ground by gravitation.

J represents what is commonly termed a "fifth-wheel," which is secured upon the hounds C' and front axle, B'. This device is applied to the present machine in order that it may be turned with dispatch, and without the slow awkward movement which has hitherto characterized the operation of this class of implements. The front axle, B', turns on a pivot and is arched or elevated at its center, so as to admit of the forward wheels passing under the frame, which in all positions of the axle B' receives support from the wheel J equal to that from the axle in its normal position.

J' represents strong metallic braces, which serve to impart strength and rigidity to the wheel J.

The simplicity of this invention precludes the necessity for a more extended description. All the parts are simple in construction and may be applied at little expense.

If desired, cultivators may be substituted for any or all of the plows, in which case the axle may be extended in length, if desired.

The axle B′, being made in the form of an arch or bow, adapts the machine to pass readily over the plants when it is used for cultivating, for which purpose the hind axle, B², occupies a somewhat elevated position.

Having thus described my invention, the following is what I claim as new therein and desire to secure by Letters Patent:

1. In combination with the levers E and plow I, the catches F, constructed, arranged, and operating substantially as and for the purposes herein set forth.

2. The standards D′, which support the seat, in combination with the levers E and catches F, the same being arranged substantially as and for the purposes set forth.

JOHN STONE.

Witnesses:
   C. D. SMITH,
   R. N. EAGLY.